(12) United States Patent
Sandhu et al.

(10) Patent No.: US 7,255,128 B2
(45) Date of Patent: Aug. 14, 2007

(54) SYSTEM AND METHOD FOR DETECTING FLOW IN A MASS FLOW CONTROLLER

(75) Inventors: Gurtej Singh Sandhu, Boise, ID (US); Sujit Sharan, Chandler, AZ (US); Neal R. Rueger, Boise, ID (US); Allen P. Mardian, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/456,055

(22) Filed: Jul. 6, 2006

(65) Prior Publication Data
US 2006/0236513 A1  Oct. 26, 2006

Related U.S. Application Data

(62) Division of application No. 10/674,963, filed on Sep. 29, 2003, now Pat. No. 7,114,404, which is a division of application No. 09/945,161, filed on Aug. 30, 2001, now Pat. No. 6,627,465.

(51) Int. Cl.
*H01L 21/66* (2006.01)
*F17D 3/00* (2006.01)
*F16K 37/00* (2006.01)
*G01B 7/00* (2006.01)

(52) U.S. Cl. ............... 137/554; 29/25.01; 324/207.16; 324/207.22

(58) Field of Classification Search ............................... 324/207.15–207.16, 207.22; 73/865.9; 137/554; 29/25.01; 700/282; 118/728
See application file for complete search history.

(56) References Cited

U.S. PATENT DOCUMENTS

| | | | |
|---|---|---|---|
| 1,877,810 A | 9/1932 | Chamberlain | |
| 2,667,748 A | * 2/1954 | Heath | .......................... 405/92 |
| 3,338,256 A | 8/1967 | Panissidi | |
| 3,341,813 A | * 9/1967 | Fletcher et al. | ............. 340/941 |

(Continued)

FOREIGN PATENT DOCUMENTS

JP  56-003365  1/1981

(Continued)

*Primary Examiner*—Thomas P. Noland
(74) *Attorney, Agent, or Firm*—Schwegman, Lundberg, Woessner & Kluth, P.A.

(57) ABSTRACT

Systems and methods are provided for detecting flow in a mass flow controller (MFC). The position of a gate in the MFC is sensed or otherwise determined to monitor flow through the MFC and to immediately or nearly immediately detect a flow failure. In one embodiment of the present invention, a novel MFC is provided. The MFC includes an orifice, a mass flow control gate, an actuator and a gate position sensor. The actuator moves the control gate to control flow through the orifice. The gate position sensor determines the gate position and/or gate movement to monitor flow and immediately or nearly immediately detect a flow failure. According to one embodiment of the present invention, the gate position sensor includes a transmitter for transmitting a signal and a receiver for receiving the signal such that the receiver provides an indication of the position of the gate based on the signal received. Other embodiments of the gate position sensor are described herein, as well as systems and methods that incorporate the novel MFC within a semiconductor manufacturing process.

27 Claims, 4 Drawing Sheets

U.S. PATENT DOCUMENTS

| | | | |
|---|---|---|---|
| 3,348,559 A * | 10/1967 | Brothman et al. | 137/47 |
| 3,354,655 A | 11/1967 | Armond | |
| 3,368,305 A * | 2/1968 | Piekarski | 49/70 |
| 4,233,157 A | 11/1980 | Miller | |
| 4,297,898 A | 11/1981 | Herzi | |
| 4,308,754 A | 1/1982 | Pedersen et al. | |
| 4,397,193 A | 8/1983 | Ryan et al. | |
| 4,413,531 A | 11/1983 | Karplus et al. | |
| 4,480,485 A | 11/1984 | Bradshaw et al. | |
| 4,480,753 A * | 11/1984 | Thomas et al. | 209/546 |
| 4,488,428 A | 12/1984 | Taniuchi | |
| 4,502,318 A | 3/1985 | Converse, III et al. | |
| 4,553,846 A | 11/1985 | Hilton et al. | |
| 4,567,776 A | 2/1986 | Adachi | |
| 4,597,048 A | 6/1986 | Mazur et al. | |
| 4,613,818 A | 9/1986 | Battocletti et al. | |
| 4,646,011 A * | 2/1987 | Wallrafen | 324/207.25 |
| 4,672,997 A | 6/1987 | Landis et al. | |
| 4,674,279 A | 6/1987 | Ali et al. | |
| 4,687,020 A | 8/1987 | Doyle | |
| 4,804,638 A | 2/1989 | Hoke et al. | |
| 4,924,710 A | 5/1990 | Inada et al. | |
| 5,040,046 A | 8/1991 | Chhabra et al. | |
| 5,040,415 A | 8/1991 | Barkhoudarian | |
| 5,055,026 A | 10/1991 | Gordon | |
| 5,238,392 A | 8/1993 | Hosokawa et al. | |
| 5,316,124 A * | 5/1994 | Barnes et al. | 194/206 |
| 5,373,737 A | 12/1994 | Hwang | |
| 5,385,056 A | 1/1995 | Marsh et al. | |
| 5,503,035 A | 4/1996 | Itoh et al. | |
| 5,658,423 A | 8/1997 | Angell et al. | |
| 5,668,327 A | 9/1997 | Amemori et al. | |
| 5,728,947 A | 3/1998 | Marsh et al. | |
| 5,736,649 A | 4/1998 | Kawasaki et al. | |
| 5,747,701 A | 5/1998 | Marsh et al. | |
| 5,801,315 A | 9/1998 | Park et al. | |
| 5,841,035 A | 11/1998 | Andoh et al. | |
| 5,844,137 A | 12/1998 | Carson | |
| 5,904,799 A | 5/1999 | Donohoe | |
| 6,077,357 A | 6/2000 | Rossman et al. | |
| 6,119,710 A | 9/2000 | Brown | |
| 6,170,492 B1 | 1/2001 | Ueda et al. | |
| 6,206,340 B1 | 3/2001 | Paese et al. | |
| 6,216,726 B1 | 4/2001 | Brown et al. | |
| 6,276,047 B1 | 8/2001 | Webster et al. | |
| 6,290,806 B1 | 9/2001 | Donohoe | |
| 6,321,765 B2 | 11/2001 | Gill | |
| 6,325,017 B1 | 12/2001 | DeBoer et al. | |
| 6,343,617 B1 | 2/2002 | Tinsley et al. | |
| 6,358,327 B1 | 3/2002 | Pokharna et al. | |
| 6,368,398 B2 | 4/2002 | Vaartstra | |
| 6,378,357 B1 | 4/2002 | Han et al. | |
| 6,413,358 B2 | 7/2002 | Donohoe | |
| 6,427,718 B1 | 8/2002 | Stringam et al. | |
| 6,429,120 B1 | 8/2002 | Ahn et al. | |
| 6,447,674 B1 | 9/2002 | Simon et al. | |
| 6,461,982 B2 | 10/2002 | DeBoer et al. | |
| 6,500,300 B2 | 12/2002 | Donohoe | |
| 6,502,458 B1 | 1/2003 | Kruger et al. | |
| 6,609,419 B1 | 8/2003 | Bankart et al. | |
| 6,807,875 B2 | 10/2004 | Lebrun et al. | |
| 7,055,539 B2 | 6/2006 | Suzuki | |
| 2001/0009404 A1 | 7/2001 | Paese et al. | |
| 2001/0052261 A1 | 12/2001 | Lull et al. | |
| 2002/0189947 A1 | 12/2002 | Paul et al. | |
| 2002/0198668 A1 | 12/2002 | Lull et al. | |
| 2003/0033867 A1 | 2/2003 | Posey et al. | |
| 2006/0218762 A1 * | 10/2006 | Sandhu et al. | 29/25.01 |
| 2006/0219031 A1 * | 10/2006 | Sandhu et al. | 73/865.9 |
| 2006/0223204 A1 * | 10/2006 | Sandhu et al. | 438/14 |

FOREIGN PATENT DOCUMENTS

| | | |
|---|---|---|
| JP | 57-144373 | 9/1982 |
| JP | 05-002429 | 1/1993 |
| WO | WO-8903104 A1 | 4/1989 |

* cited by examiner

SYSTEM AND METHOD FOR DETECTING FLOW IN A MASS FLOW CONTROLLER

RELATED APPLICATION(S)

This application is a Divisional of U.S. application Ser. No. 10/674,963 filed Sep. 29, 2003, now U.S. Pat. No. 7,114,404, which is a Divisional of U.S. application Ser. No. 09/945,161 filed Aug. 30, 2001, now U.S. Pat. No. 6,627,465, both of which are incorporated herein by reference.

TECHNICAL FIELD

This invention relates generally to the detection of flow and flow failure in a mass flow controller, and more particularly to the delivery of semiconductor process gas in semiconductor manufacturing processes and the monitoring thereof for flow and flow failure.

BACKGROUND

An integrated circuitry is formed in and on a wafer in semiconductor manufacturing processes. Forming an integrated circuit on a wafer involves a number of sub-steps such as thermal oxidation, masking, etching and doping. In the thermal oxidation sub-step, the wafers are exposed to ultra-pure oxygen under carefully controlled conditions to form a silicon dioxide film, for example, on the wafer surface. In the masking sub-step, a photoresist or light-sensitive film is applied to the wafer, an intense light is projected through a mask to expose the photoresist with the mask pattern, the exposed photoresist is removed, and the wafer is baked to harden the remaining photoresist pattern. In the etching sub-step, the wafer is exposed to a chemical solution or gas discharge to etch away or remove areas not covered by the hardened photoresist. In the doping sub-step, atoms with either one less or one more electron than silicon are introduced into the area exposed by the etching process to alter the electrical character of the silicon. These sub-steps are repeated for each layer. Most of or all of these processes require the controlled introduction of gases into a processing chamber, and mass flow controllers are used to control the same. Each chip on the wafer is finally tested after the remaining metals, films and layers have been deposited. Subsequently, the wafer is sliced into individual chips that are assembled into packages.

Semiconductor gases are used in the above-described manufacturing process, and include, but are not limited to gases which serve as precursors, etchants and dopants. These gases are applied to the semiconductor wafer in a processing chamber. Precursor gases provide a source of silicon atoms for the deposition of polycrystalline silicon, epitaxial silicon, silicon dioxide and silicon nitride film within the thermal oxidation step. Etchant gases provide fluorocarbons and other fluorinated materials that react with silicon, silicon dioxide and silicon nitride. Dopants provide a source of controllable impurities that modify the local electrical properties or characteristics of the semiconductor material. A reliable supply of high purity process gases is required for advanced semiconductor manufacturing. As the semiconductor industry moves to smaller feature sizes, a greater demand is placed on the control technologies to accurately and reliably deliver the semiconductor process gases.

Mass Flow Controllers (MFCs) are placed in an inflow line to control the delivery of the semiconductor process gas. Conventional MFCs have an iris-like restricted orifice for controlling flow, and deliver gas or other mass at a low velocity. This low velocity allows interfering feedback in the MFC; i.e. the pressure differentials occurring in the chamber travel back upstream through the gas and perturb the delivery velocity of the gas. Therefore, a problem associated with conventional MFCs is that they are dependent on the characteristics of the specific chamber into which the gas is being delivered, and require trial and error methods to find the proper valve position for delivering a desired flow of material into the chamber. An obvious drawback to this approach is that the experimentation is very time consuming.

Ultrasonic MFCs meter gas flowing through an orifice of a known size at a velocity higher than the speed of sound. The mass flow is controlled using a gated orifice by oscillating a gate between an opened and closed position with respect to the orifice. The amount of material delivered into the chamber is adjusted by adjusting the duty cycle of the oscillations; i.e. by adjusting the amount of time per oscillation period that the gate is opened rather than closed. Because pressure differentials can only travel through the gas at the speed of sound, pressure variations in the chamber do not travel upstream quickly enough to perturb the ultrasonic delivery velocity. Thus, ultrasonic MFCs have feed forward control as they are able to deliver exactly the desired amount of material into the chamber without being affected by any feedback from the chamber. However, a problem associated with ultrasonic MFCs is that control gates regulating the precision flow may fail by becoming stuck either in an opened position, a closed position, or in some position in between the opened and closed positions. And in the case of the above-described process for manufacturing semiconductors, this failure may not be detected for a considerable amount of time causing considerable losses in both processing time and resources.

Therefore, there is a need in the art to provide improved MFC which overcomes these problems.

DETAILED DESCRIPTION

Figure 1:
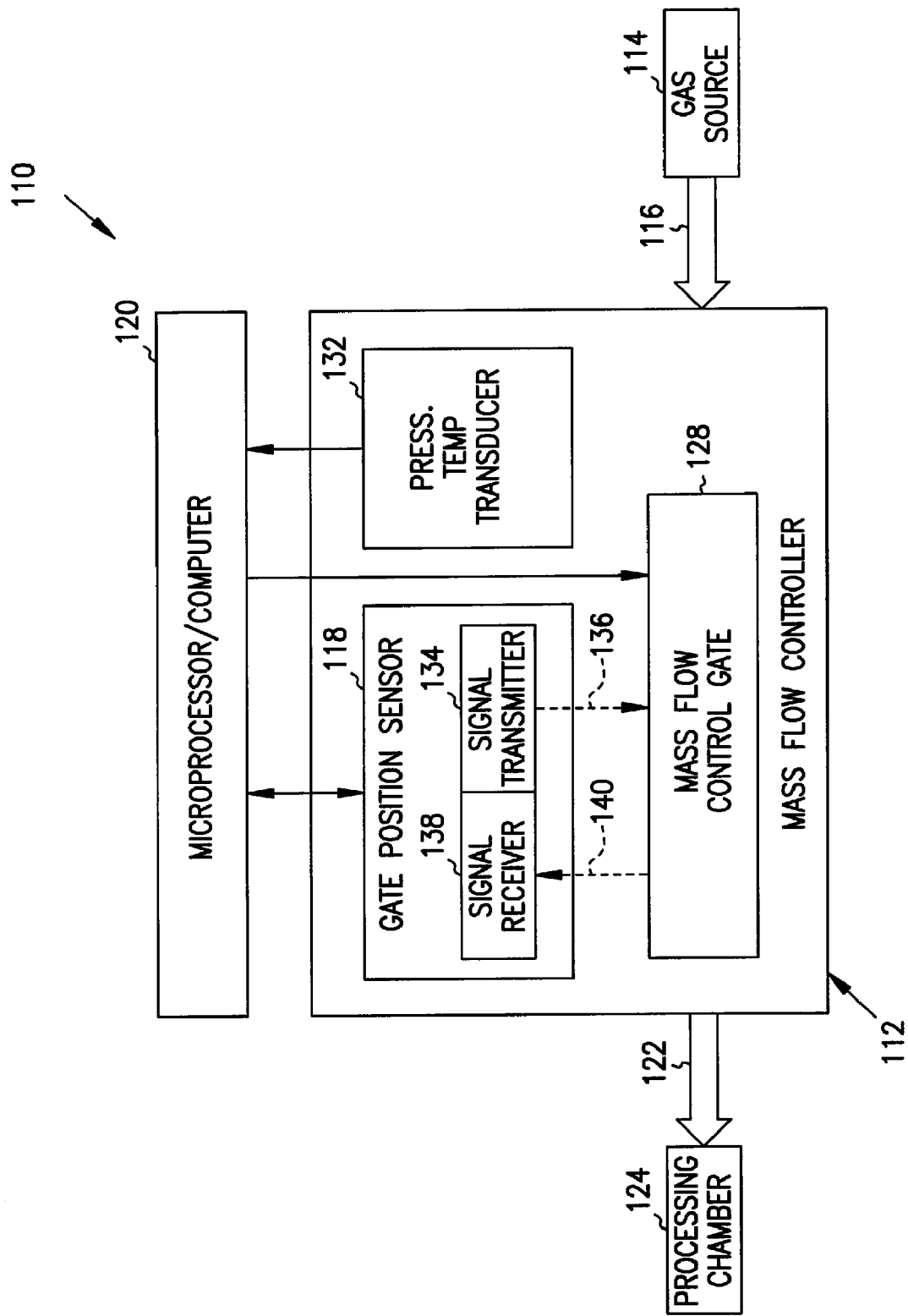
FIG. 1 illustrates a novel MFC and electronic system for delivering a mass and for detecting a flow failure according to the teachings of the present invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention.

Other embodiments may be utilized and structural, logical, and electrical changes may be made without departing from the scope of the present invention.

The term wafer, as used in the following description, includes any structure having an exposed surface with which to form the integrated circuit (IC) structure of the invention. The term wafer also includes doped and undoped semiconductors, epitaxial semiconductor layers supported by a base semiconductor or insulator, as well as other semiconductor structures well known to one skilled in the art. The term conductor is understood to include semiconductors, and the term insulator is defined to include any material that is less electrically conductive than the materials referred to as conductors. The following detailed description is, therefore, not to be taken in a limiting sense, and the scope of the present invention is defined only by the appended claims, along with the full scope of equivalents to which such claims are entitled.

Systems and methods are provided for detecting flow and flow failure in a MFC. These systems and methods are particularly useful in delivering semiconductor gas in a semiconductor manufacturing process using an ultrasonic MFC. The mass flow through the MFC is monitored by sensing or otherwise determining the position and/or motion of the gate in an ultrasonic MFC. Therefore, the system is able to immediately or nearly immediately detect a flow failure, and provide an indication of the same, caused by a gate being stuck in an opened position, a closed position, or a position in between the opened and closed positions. Given the relatively long time horizon for semiconductor manufacturing processes and the fact that the testing is conducted late in the process, significant losses of manufacturing time and material are avoided through the early detection of flow failure.

In one embodiment of the present invention, a novel MFC is provided. The MFC includes an orifice, a mass flow control gate, an actuator and a gate position sensor. The mass flow control gate controls flow through the orifice, and the actuator moves the gate to control flow through the orifice. The gate position sensor senses or otherwise determines the gate position to monitor flow and immediately or nearly immediately detect a flow failure caused by a stuck gate. The novel MFC may be incorporated into an electronic system such as a semiconductor manufacturing system.

In a further embodiment of the present invention, a novel method is provided. The method comprises the steps of providing a mass flow controller in an ultrasonic mass flow line, oscillating a gate in the mass flow controller at a desired frequency between an opened and closed position, and monitoring gate movement. This method may be incorporated into a method for delivering a semiconductor gas in a semiconductor manufacturing process, and into a method for detecting a gas flow failure in a semiconductor manufacturing process.

According to the teachings of the present invention, a novel choke-orifice or gated-orifice MFC capable of detecting flow and flow failure in the MFC is described. The MFC uses an oscillating control gate to control or otherwise regulate the delivery of an ultrasonic gas or other substance. A gate position sensor senses or otherwise determines the position and/or the motion of the control gate. Thus, the gate position sensor can detect a stuck gate and thus detect flow failure in the MFC. The gate position sensor may also be used to monitor the oscillations of the control gate, and the duty cycle thereof, to continuously monitor the flow through the MFC by verifying that the control gate is operating as anticipated and desired.

The MFC is described below first with respect to a general electronic system, and then in particular with respect to a semiconductor manufacturing system. Subsequently, the MFC itself and the gate position sensor of the MFC is described in detail. Finally, specific methods utilizing the MFC of the present invention are provided.

An electronic delivery system 110 incorporating a mass flow controller 112 is generally illustrated in FIG. 1. The system 110 generally comprises a source 114, a flow controller 112 connected to the source 114 through an inflow line 116, a sensor 118, a processor 120, and an outflow line 122 connected to a chamber 124. The inflow line 116 delivers the substance from the source 114 to mass flow controller 112, which in turn regulates the flow of the substance out through the outflow line 122. This delivered substance may comprise any material. Therefore, the flow controller 112 is often referred to as a mass flow controller (MFC). The flow controller 112 may be referred to as a liquid flow controller (LFC) if a liquid substance is being delivered by the system 110, or even a gas flow controller (GFC) if a gas substance is being delivered. However, for the purposes of this application and the teaching contained herein, the terms MFC, LFC and GFC are deemed equivalent as they both deliver a substance.

Figure 2:
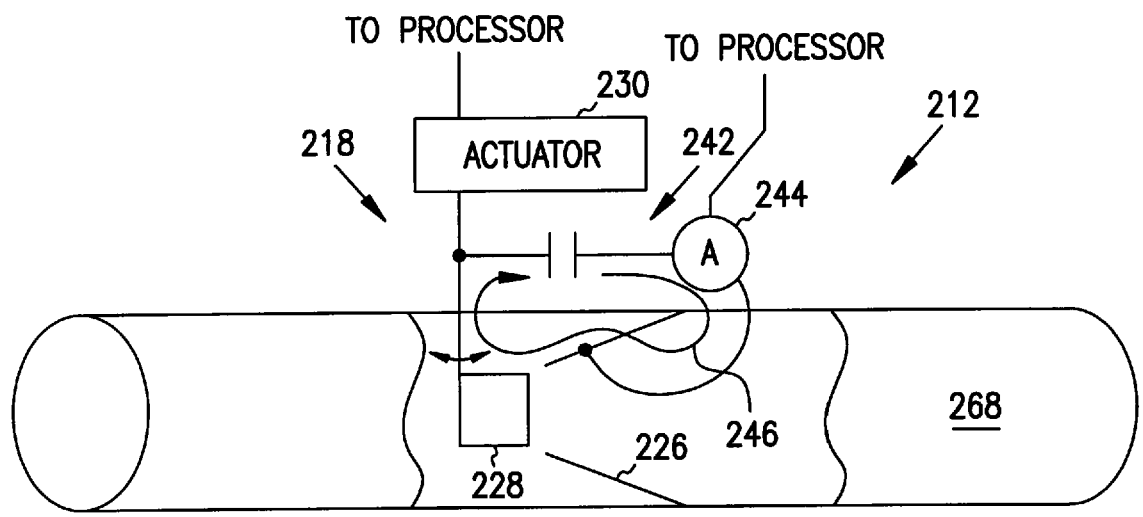
FIG. 2 illustrates a current detector embodiment of a gate position sensor used in the MFC of FIG. 1.

The MFC 112 is positioned in the flow, and is adapted for controlling or regulating the flow out through the outflow line 122. An ultrasonic MFC 112 passes a high velocity flow (higher than the speed of sound) through an orifice 226, specifically through a gated orifice. As described throughout this specification and as shown in the Figures, the term orifice 226 is intended to cover not only the opening through which the mass flows, but also the surrounding structure that forms or defines the opening and that contacts the gate when the gate 228 is closed. A gate 228 and corresponding actuator 230 for moving the gate 228, as generally illustrated in FIG. 2 and is also illustrated in FIGS. 3-6 using like numbers, is operably positioned proximate to the orifice 226 such that the gate 228 may oscillate between a closed position in which the flow through the orifice 226 is prevented, and an opened position in which the flow through the orifice 226 is allowed. The actuator 230 oscillates or shutters the gate 228 between the opened and closed positions to regulate the ultrasonic flow through the orifice 226. The amount of substance that is delivered through the MFC 212 is therefore dependent upon the duty cycle of the gate 228, which corresponds to the relative amount of time that the gate 228 is opened rather than closed for each opened-to-closed-to-opened cycle.

Referring again to FIG. 1, the gate position sensor 118 senses, detects or otherwise monitors the position of the gate 128. In one embodiment of the present invention, the gate position sensor 118 determines whether the gate 128 is in an opened position or is in a closed position. In other embodiments, the sensor 118 is designed to determine whether the gate 128 is moving as expected so as to verify proper operation. Additionally, the gate position sensor 118 may be designed to accurately detect the position that the gate 128 is in between the opened and closed positions.

The electronic system 110 includes the processor 120 that is interfaced with the actuator 130 of the control gate 128 to control the duty cycle of the gate 128. That is, the processor sends a control signal to oscillate the control gate 128 for the purpose of regulating the flow through the MFC 112. The processor 120 further may be interfaced with the gate position sensor 118, and thus is able to determine the position and/or motion of the control gate 128. The processor 120 may include appropriate software programs to provide a number of functions, including but not limited to, verifying that the desired position of the control gate 128 corresponds with the actual position of the control gate 128 as sensed by the gate position sensor 118, providing feedback control to adjust the duty cycle to obtain the desired flow, and warning operators of flow failure. Alternatively, in lieu of sending an indication signal from the gate position sensor 118 to the processor 120, the sensor 118 may provide an output to an audio or visual device, or may otherwise provide a signal to other control circuitry.

FIG. 1 illustrates the electronic system 110 as a semiconductor manufacturing system in which the inflow line 116 is connected to a semiconductor process gas source 114. For an ultrasonic MFC, the inflow line 16 provides an ultrasonic gas flow to the MFC 112. As indicated above, the MFC 112 regulates the ultrasonic gas flow by oscillating the control gate 128 between closed and opened positions with respect to the orifice 126. The regulated or controlled gas flow is delivered to a processing chamber 124 in which various semiconductor processes are performed on the wafer. These processes may include, for example, deposition, etching, and doping. Also as illustrated in FIG. 1, the MFC 112 may include a pressure and temperature transducer 132 interfaced with the processor 120 to monitor the characteristics of the gas and provide appropriate feedback control to the control gate 128.

Generally, the gate position sensor 118 includes a transmitter 134 for transmitting a signal 136 and a receiver 138 for receiving the signal 140. The receiver 138 provides an indication of whether the control gate 128 is in an opened position, a closed position, or is in another position based on the signal 140 received. The receiver 138 may also provide a signal that the control gate is moving, either in addition to or in place of the position signal. The processor 120, or other control circuitry, interprets the signal 140 received by the receiver 138 to provide an immediate or nearly immediate warning if there has been a flow failure or if the control gate 128 has otherwise malfunctioned. As is described in more detail below with respect to the detailed description of the MFC 112 and the gate position sensor 118, there are a number of embodiments for the gate position sensor 118. The following embodiments provide a non-exhaustive list of sensor 118 designs for determining the gate position and/or gate movement that fall within the teachings of the present invention for determining flow and flow failure.

In one embodiment, as generally illustrated in FIG. 2 and will be discussed in more detail below, the gate position sensor 218 may include a device 242 that applies an electrical potential across the orifice 226 and the gate 228 in the MFC 212. The sensor 218 further may include a current detector 244 that is able to detect a current flow through a junction formed when the orifice 226 contacts the gate 228 when the gate 228 is closed, i.e. an orifice/gate junction. Thus, in this embodiment, the transmitter 134 shown in FIG. 1 is the device 242 for applying electric potential across the gate 228 and an orifice 226 in the MFC 212, the signal 136 and 140 shown in FIG. 1 is electric current 246 flowing through the orifice/gate junction formed when the gate 228 is closed, and the receiver 138 shown in FIG. 1 is a current detector 244 for detecting current flowing through the orifice/gate junction.

Figure 3:
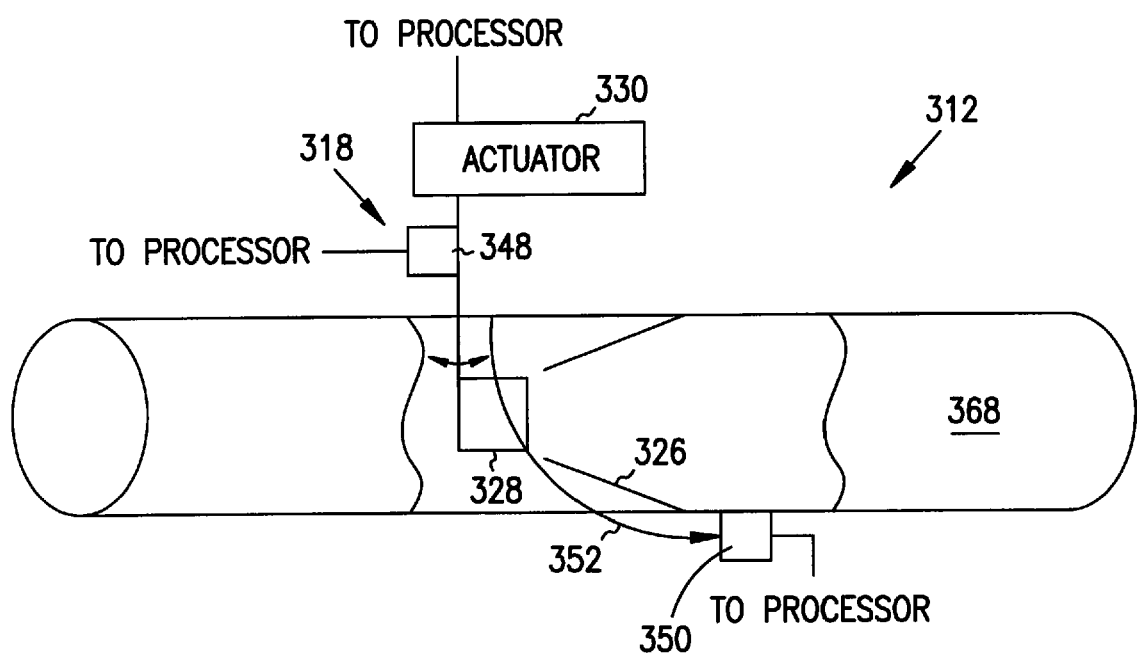
FIG. 3 illustrates a physical wave generator/receiver embodiment of a gate position sensor used in the MFC of FIG. 1, and a direct detection method of using the same.
Figure 4:
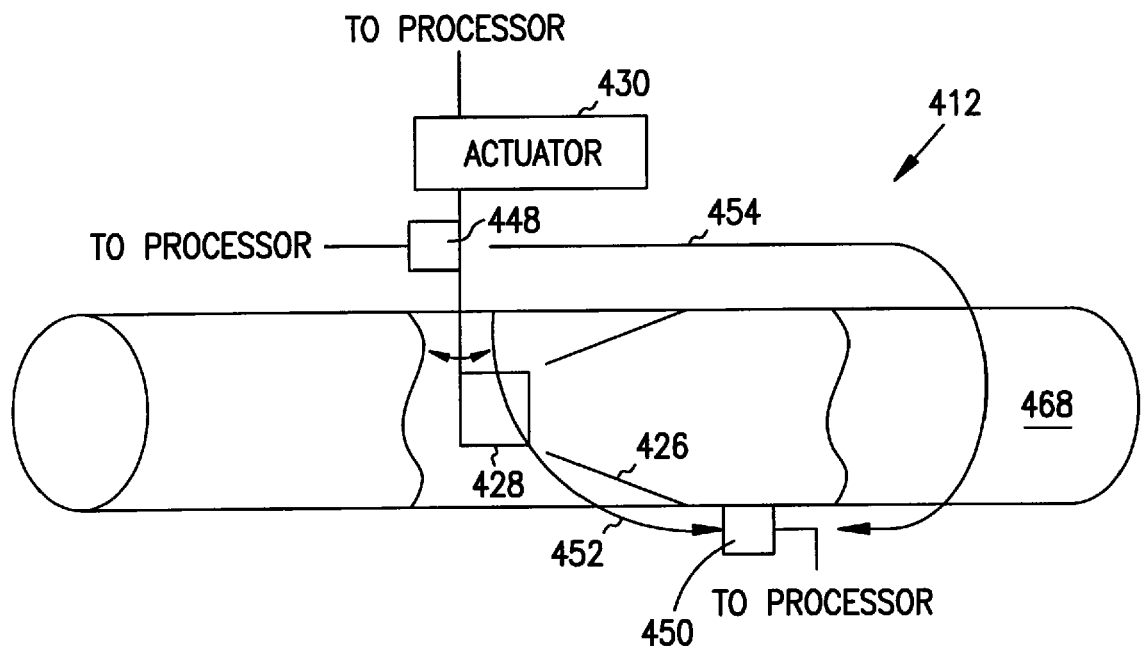
FIG. 4 illustrates a physical wave generator/receiver embodiment of a gate position sensor used in the MFC of FIG. 1, and a signal interference detection method of using the same.

In another embodiment, as generally illustrated in FIGS. 3 and 4 using like numbers and will be discussed in more detail below, the gate position sensor 318 may include a physical wave generator 348 and at least one physical wave receiver 350. The physical wave generator 348 generates a physical signal 352 in the MFC 312. The physical wave receiver 350 detects the physical signal 352 propagating from the generator 348 through an orifice/gate junction formed when the gate 328 is closed. Thus, in this embodiment, the transmitter 134 of FIG. 1 is the physical wave generator 348, the signals 136 and 140 of FIG. 1 are the physical signal 352 propagating through the orifice/gate junction formed when the gate 328 is closed, and the receiver 138 of FIG. 1 is the physical wave receiver 350 for detecting the physical signal 352 propagating through the orifice/gate junction.

Figure 5:
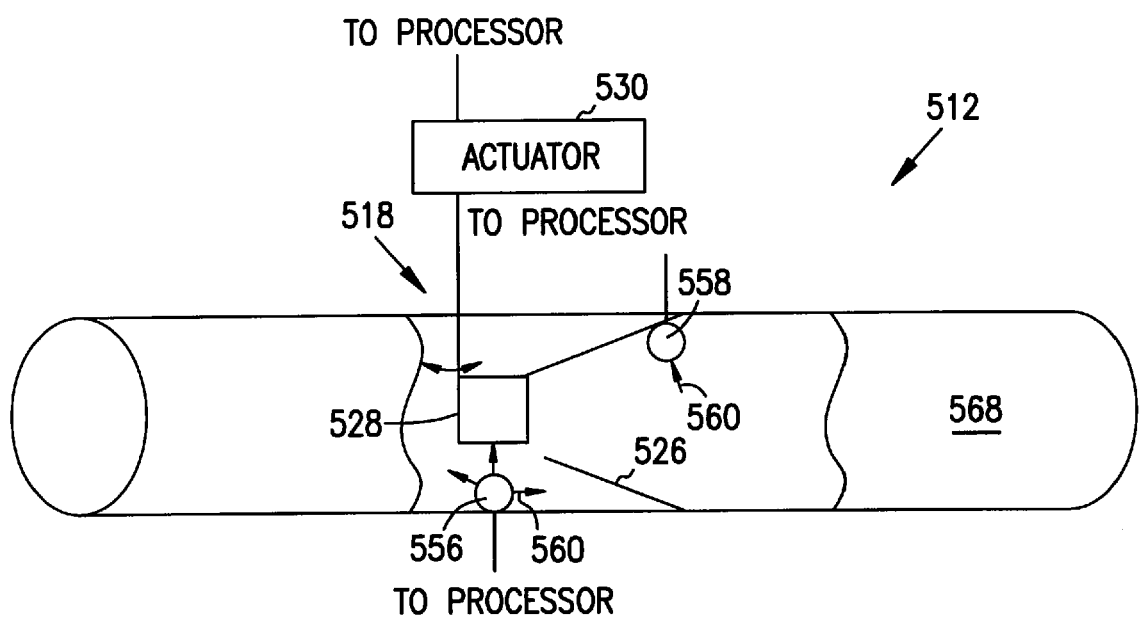
FIG. 5 illustrates an optical detector embodiment of a gate position sensor used in the MFC of FIG. 1.

In another embodiment, as generally illustrated in FIG. 5 and will be discussed in more detail below, the gate position sensor 518 includes a light source 556 and a light detector 558. The light source 556 is positioned on a first side of an orifice 526 in the MFC 512, and the light detector 558 is positioned on a second side of the orifice 526. The light source 556 and light detector 558 are positioned and arranged so that, as the control gate 528 oscillates between an opened position a closed position with respect to the orifice 526, a light signal 560 received by the light detector 558 and transmitted by the light source 556 will be interrupted such that the gate position can be determined by the interrupted signal. In one embodiment, the light source 556 and light detector 558 are placed on opposing inflow and outflow ends of the orifice 526. Thus, in this embodiment, the transmitter 134 of FIG. 1 is the light source 556, the signals 136 and 140 of FIG. 1 are the light signal 560 transmitted by the light source 556, and the receiver 138 of FIG. 1 is the light detector 558 operably positioned with respect to the light source 556 and the orifice 526 such that movement of the control 528 gate oscillating between an opened position and a closed position interrupts the light signal 560 from being received by the light detector 558.

Figure 6:
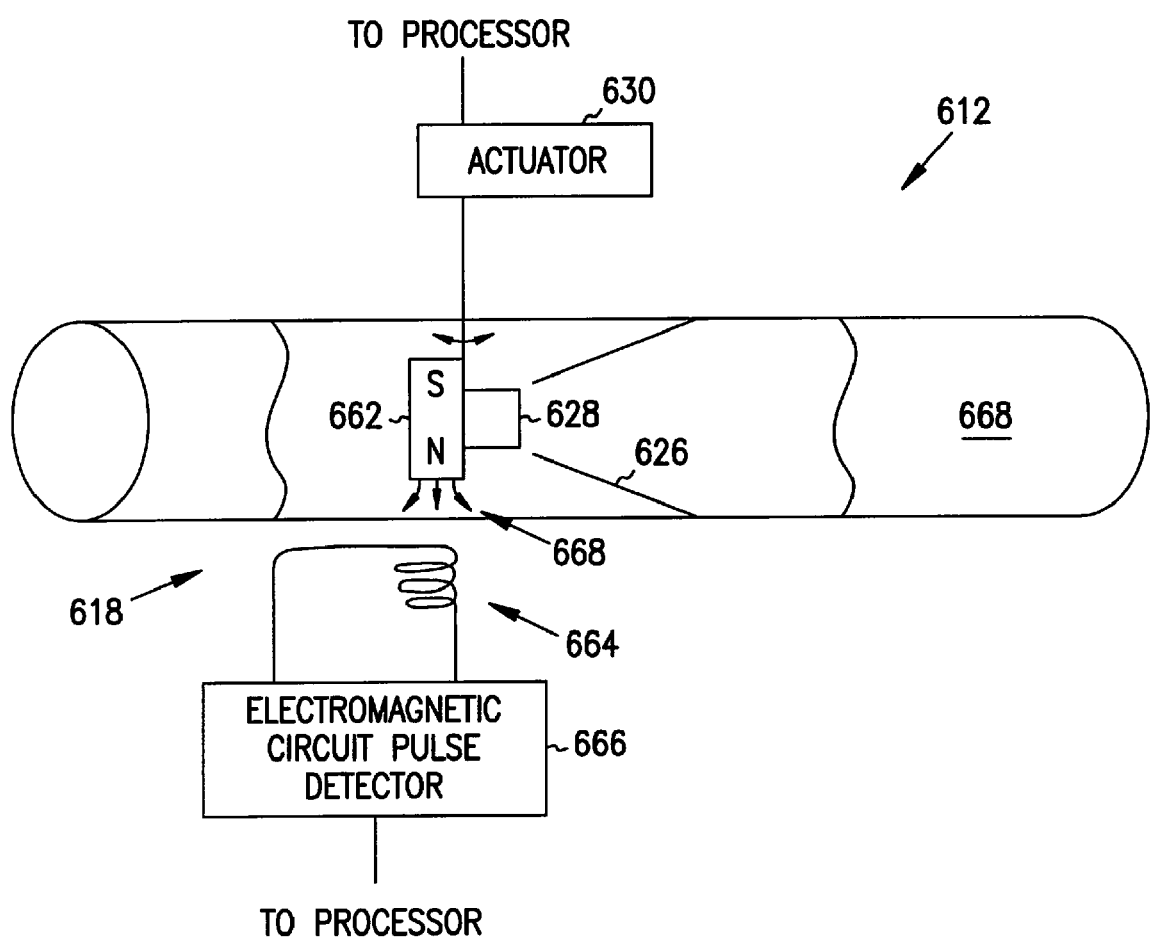
FIG. 6 illustrates an electromagnetic pulse detector embodiment of a gate position sensor used in the MFC of FIG. 1.

In another embodiment, as generally illustrated in FIG. 6 and will be discussed in more detail below, the gate position sensor 618 includes a magnet 662, a cooperating induction coil 664, and an electromagnetic pulse detector 666. Movement of the control gate 628 generates a magnetically induced signal in the induction coil 664 detectable by the electromagnetic pulse detector 666. Thus, in this embodiment, the transmitter 134 of FIG. 1 is the magnet 662, the signals 136 and 140 of FIG. 1 are magnetic flux 668 from the magnet 662, and the receiver 138 of FIG. 1 is the combination of the cooperating induction coil 664 and the electromagnetic pulse detector 666 for detecting a magnetically induced signal in the induction coil 664. The control gate 628 movement induces the signal in the coil by providing relative movement between the magnet 662 and the coil 664.

The MFC 112 of FIG. 1 is illustrated in more detail in FIG. 2 and in FIGS. 3-6 using like numbers. The illustrated MFC has a generally cylindrical structure 268, somewhat akin to the shape of a conventional gas inflow line. However, the illustrated structure 268, and the arrangement of the elements within, is not intended to describe any specific MFC or MFC structure, but rather is intended solely for the purpose of illustrating the present invention.

In addition to the structure 268, the MFC 12 generally comprises an orifice 226 defined herein to include the surrounding structure that defines an opening, a mass flow control gate 228, an actuator 230, and a gate position sensor 218. The control gate 228 is movable toward and away from the orifice 226 to control flow through the orifice 226. In response to a control signal from the microprocessor 120, for example, the actuator 230 moves the control gate 228 as desired either toward the orifice 226 into a closed position or away from the orifice 226 into an opened position. In this manner, the actuator 230 oscillates the control gate 228 through a desired duty cycle between a closed position and an open position to control flow through the orifice 226. The duty cycle controls the flow, and is determined by the total time that the control gate 228 is in an open position in comparison to the entire period of time it takes to move the control gate 228 from an open position to a closed position and back to the open position. The gate position sensor 118 is adapted to determine the position and/or movement of the control gate 228. And as illustrated above with respect to FIG. 1, the gate position sensor 118 generally can be considered to include a transmitter 134 for transmitting a signal 136 and a receiver 138 for receiving the signal 140. The receiver 138 provides an indication of a gate position or a gate movement based on the signal received. This indication may be provided as an input to the processor 120, to other control circuitry, or to audio or visual indicators.

According to the teachings of the present invention as indicated above and as generally illustrated in FIG. 1, a gate position sensor 118 is used to sense or detect the position and/or the movement of the control gate 128 of the MFC 112. The sensor 118 may either form part of the MFC 112, or may be a separate component of an electronic system 110 that contains a MFC 112. Also according to the teachings of the present invention and as one skilled in the art would understand, the specific design of the gate position sensor 118 may vary. That is, the specific transmitter 134 and receiver 138 that is selected, and the arrangement thereof, may vary according to the particular characteristics of the actual physical devices. Therefore, the following embodiments of the gate position sensor 118 is intended as a non-exhaustive list of sensor designs that would enable one skilled in the art to design and build the same or equivalent sensor.

Referring now to FIG. 2, the illustrated gate position sensor 218 includes a device 242 for applying an electrical potential across the orifice 226 and the control gate 228. The device 242 may include, but is not limited to, a battery or an electronic voltage supply. For example, it is anticipated that it may be desirable to use a switchable power device as the device 242 for applying electric potential. An orifice/gate junction is formed to complete a circuit when the control gate 228 is closed. A current detector 244 is able to detect the current flow 246, or an increase in current flow, through the orifice/gate junction. Based on the detection of this current 246, the system 110 is able to determine that the control gate is closed 228. Any number of current detection means may be used to detect the current. Therefore, one skilled in the art would be able to design or provide an appropriate detection circuit for a particular device. Electrical connections are illustrated at the arm of the gate 228 and at the orifice 226. Therefore, the gate 228 and orifice 226 form a conductor through which current may pass when the control gate 228 is closed and the orifice/gate junction is formed.

When the control gate 228 is open, no current other than leakage currents through alternative pathways within the entire structure 268 will be detected. The MFC 212 may be designed such that adequate electrical insulation is maintained for all alternative pathways so that leakage current intensities will be orders of magnitude lower than the closed orientation current. As the conductivity of the structure 268 and the specific characteristics of the actuator 230 vary, it is anticipated that one skilled in the art would be able to determine these characteristics and design an appropriate electrical circuit that permits the system to detect current through the orifice/gate junction and otherwise operate as intended without causing any damage to the equipment.

Referring now to FIGS. 3-4, the gate position sensor 318 is illustrated to include a physical wave generator 348 for generating a physical signal 352 and at least one physical wave receiver 350 for receiving the physical signal 352. As one skilled in the art would recognize based on the teachings of the present invention, the positions of the generator 348 and receiver 350 may vary. The receiver 350 may be considered to be a transducer that forms a vibration sensor or switch. The physical wave generator 348 and the physical wave receiver 350 may be formed using piezoelectric crystals. However, this embodiment of the invention is not so limited to the use of piezoelectric crystals.

The physical wave generator 348 is driven with an ultrasonic frequency and sends ultrasonic physical waves through the structure 368. The receiver 350 receives the ultrasonic wave form 352 through the orifice/gate junction formed when the control gate 328 is closed. When the control gate 328 is open, the wave energy can only be received by the receiver 350 via a secondary pathway, i.e. physical signal 454 in FIG. 4 for example, throughout the structure 368, and therefore will register as a much lower intensity or amplitude. The system 110 is able to determine that the control gate 328 is in a closed position when the physical signal receiver 350 provides an indication that it has detected the physical signal 352 which propagated through the orifice/gate junction.

A direct physical wave detection method is illustrated in FIG. 3; namely, the physical wave receiver 350 directly detects the closed gate by sensing an increased amplitude in the physical signal received by the receiver 350 caused by the signal 352 being directly transmitted through the orifice/gate junction. When the control gate 328 is closed, the signal detected by the receiver 350 will be strong due to the direct connection between the generator 348 and the receiver 350. When the control gate 328 is open, the signal will be weak due to a non-existent or weak signal 354 being transmitted elsewhere throughout the structure 368, depending on the physical construction of the system. In other words, a portion of the generated physical wave may be transmitted as signal 454 of FIG. 4 throughout the structure and as signal 352 through the orifice/gate junction. The received physical signal will be significantly higher if a direct signal path 352 is provided between the physical wave generator 348 and physical wave receiver 350.

A physical wave signal interference detection method is illustrated in FIG. 4; namely, the physical wave receiver 450 is adapted for detecting and distinguishing a complex wave formed from a superposition of a first physical signal 454 and a second physical signal 452. It simplifies this analysis to consider that the structure 468 has at least two separate pathways 452 and 454 for the physical wave transmission to be detected at the receiver 450. The required time for each transmission is a function of the entire structure 468, and the interferences between the signals 452 and 454 from all possible paths will give a complex waveform at the receiver 450. The first physical signal 454 is propagated throughout the structure 468 when the control gate 428 is open. For a given generator 448/receiver 450 arrangement on a given structure 468, the first physical signal 454 will have a signature wave form. The second physical signal 452 is directly propagated from the physical wave generator 448 to the physical wave receiver 450 through the orifice/gate junction formed when the control gate 428 is closed. Similarly, for a given generator 448/receiver 450 arrangement on a given structure 468, the second physical signal will have a signature wave form. It follows that the superposition of the first and second signals 454 and 452 will also have a signature wave form. These signature waveforms are repeatable. Therefore, for physical wave signal interference detection method, the system 110 includes circuitry capable of distinguishing the first signal 454 from the superposition of the first and second signals 454 and 452 in order to determine whether the control gate 428 is closed.

Alternatively, other receivers/transducers could be located at intermediate positions between the generator 348 and the receiver 350. The generator 348 may send a coded signal, and the arrival time of the coded signal at each receiver/transducer would indicate whether the control gate 328 is opened or closed.

As another alternative, the physical wave generator may be considered to be the control gate 328 itself as it produces a physical wave throughout the structure 368 each time it closes. In this situation, the physical wave receiver 350 is positioned and arranged to detect, and if necessary distinguish from other physical signals, the physical signal generated by the gate 328 when it closes. This embodiment monitors the self-generated sound wave of a gated orifice.

Referring now to FIG. 5, the gate position sensor 518 is illustrated to include a light source 556 positioned on a first side of the orifice 526 and a light detector 558 positioned on a second side of the orifice 526. Movement of the control gate 528 oscillating between an opened position and a closed position interrupts the light signal 560 from being received by the light detector 558. As one of ordinary skill would understand from reading this disclosure, there are a number of possible layouts of the light source 556 and the light detector 558 that could be used to detect a gate position or gate motion. One, as illustrated in FIG. 5, shows the light source 556 and the light detector 558 on opposing inflow and outflow ends of the orifice 526 such that the light detector 558 receives the light signal 560 from the light source 556 through the orifice 526. Another possible arrangement is to have the light source 556 and the light detector 558 across the control gate 528 from each other. A light detector 558 with a fast response will be able to directly monitor the frequency of the opening and closing of the gate 528, and thus give a direct measure of the gas flow through the MFC 512 in addition to simply detecting whether the gate 528 is opened, is closed, or is moving between the opened and closed positions. Additionally, the detection circuitry may be such as to detect the change in intensity of the detected light signal 560 in order to detect the position of a partially closed or partially opened gate 528.

Referring now to FIG. 6, the gate position sensor 618 is illustrated to include a magnet 662, a cooperating induction coil 664, and an electromagnetic pulse detector 666. Movement of the gate 628 generates a magnetically induced signal in an induction coil 664 detectable by the electromagnetic pulse detector 666. As one skilled in the art would understand from reading this disclosure, there are a number of designs that may be used within this embodiment that still falls within the teaching of this invention. The magnet 662 may either be a permanent magnet, as illustrated, or an electrically activated magnetic coil. Either the magnet 662 or the induction coil 664 may be attached to the moving arm of the gate 628, with the other operably located nearby so that the changing magnetic flux 668 caused by the motion of the control gate 628 will induce an electromagnetic signal in the induction coil 664.

The Figures presented and described in detail above are similarly useful in describing the method embodiments for operating MFCs, systems incorporating MFCs, and gate position sensors incorporated in MFCs.

Therefore, according to the teachings of the present invention, a method is taught comprising providing a mass flow controller in an ultrasonic mass flow line, oscillating a gate in the mass flow controller at a desired frequency between an opened position and a closed position to regulate the mass flow, and monitoring gate movement. In one embodiment, monitoring gate movement may include verifying an actual gate position against a desired gate position, and/or transmitting a signal in the mass flow controller, receiving the signal, and determining whether the gate is opened or closed based on the signal received. Additionally, oscillating a gate at a desired frequency may include varying a duty cycle to adjust mass flow through the mass flow controller.

Furthermore, according to the teachings of the present invention, a method for delivering a semiconductor gas for a semiconductor manufacturing process is taught, comprising providing a mass flow controller in an ultrasonic semiconductor gas flow line, oscillating a gate in the mass flow controller between an opened position and a closed position, and monitoring operation of the gate by transmitting a signal, receiving the signal, and determining whether the gate is opened or closed based on the signal received.

In one embodiment, transmitting a signal may include applying electric potential across the gate and an orifice in the flow controller, and receiving the signal may include detecting current flowing through an orifice/gate junction formed when the gate is closed.

In another embodiment, transmitting a signal may include generating a physical wave in the mass flow controller using a physical wave generator, receiving the signal may include receiving a physical wave in the mass flow controller using a physical wave receiver, and determining whether the gate is opened or closed may include determining whether at least a component of the received physical wave was propagated through an orifice/gate junction formed when the gate is closed.

In another embodiment, transmitting a signal may include transmitting a light signal in the mass flow controller, receiving a signal may include receiving the light signal, and determining whether the gate is opened or closed may include determining whether the light signal is received.

In another embodiment, transmitting a signal may include producing magnetic flux, receiving a signal may include detecting a magnetically induced signal in a cooperating induction coil positioned within the magnetic flux, and determining whether the gate is opened or closed may include determining that the gate has moved if a magnetically induced signal is detected in the induction coil.

Additionally, according to the teachings of the present invention, a method for detecting a gas flow failure in a semiconductor manufacturing process is taught, comprising providing a flow controller in a semiconductor gas inflow line, oscillating a gate in the flow controller to control flow, and monitoring the gate to detect flow failure. In one embodiment, monitoring the gate may include verifying an actual gate position against a desired gate position. In another embodiment, monitoring the gate may include transmitting a signal, receiving the signal, and determining whether the gate has moved or is moving based on the signal received. In another embodiment, monitoring the gate may include determining that the gate is either stuck in an open position or stuck in a closed position.

Thus, the present invention provides novel systems and methods for detecting flow and flow failure in a mass flow controller. These systems and methods are particularly useful as used within semiconductor manufacturing processes.

The invention is not limited to these processes, however. The novel mass fluid controller (MFC) of the present invention provides an ultrasonic delivery using a gated orifice, and further provides a gate position sensor for detecting flow and flow failure in the MFC. Unlike conventional MFCs, the ultrasonic MFC of the present invention has feed forward control, and is not susceptible to feedback interference caused by pressure differentials in the chamber. As such, the ultrasonic MFC provides an accurate delivery of a substance. The ultrasonic MFC has an oscillating gate that moves between an opened position and a closed position to regulate or control flow through the MFC. Additionally, the ultrasonic MFC of the present invention includes a gate position sensor that senses or otherwise detects the position and/or movement of the oscillating gate. As such, the gate position sensor determines if the gate is stuck or has otherwise failed without notice, and thus guards against the considerable loss of process time and material that would likely occur without an immediate or nearly immediate detection and indication of a flow failure.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A gate position sensor, comprising:
    an orifice and a gate adapted to adjust flow through the orifice;
    a magnet to generate a magnetic flux; and
    an induction coil and an electromagnetic pulse detector adapted to cooperate to detect a magnetically induced signal in the induction coil when gate movement provides relative movement between the magnet and the coil.

2. The sensor of claim 1, wherein the orifice and the gate are an orifice and a gate from an ultrasonic mass flow controller adapted to control gas flow from a semiconductor gas source to a semiconductor processing chamber.

3. The system of claim 1, wherein the gate is adapted to oscillate between an open and closed position with respect to the orifice.

4. A gate position sensor, comprising:
    a transmitter for transmitting a signal in a flow controller, wherein a position of a gate in the flow controller affects the signal; and
    a receiver for receiving the signal, wherein the receiver is adapted to provide a signal output for the sensor to indicate a gate position within the flow controller based on the signal received,
    wherein the transmitter is a magnet, the signal is magnetic flux from the magnet, and the receiver is a combination of a cooperating induction coil and an electromagnetic pulse detector for detecting a magnetically induced signal in the induction coil, and wherein gate movement induces the signal by providing relative movement between the magnet and the coil.

5. The sensor of claim 4, wherein the transmitter includes a transmitter for transmitting a signal in a mass flow controller.

6. The sensor of claim 4, wherein the transmitter includes a transmitter for transmitting a signal in an ultrasonic mass flow controller.

7. A gate position sensor for a flow controller having an orifice and a gate for closing the orifice, comprising:
    a magnet;
    a cooperating induction coil operably positioned with respect to the magnet, wherein the magnet and the induction coil are operably positioned with respect to the gate of the flow controller; and
    an electromagnetic pulse detector such that movement of the gate generates a magnetically induced signal in the induction coil detectable by the detector.

8. The electromagnetic gate position sensor of claim 7, wherein the magnet includes a permanent magnet.

9. The electromagnetic gate position sensor of claim 7, wherein the magnet includes an electrically activated magnetic coil.

10. The sensor of claim 7, wherein the sensor is adapted to sense gate movement for an ultrasonic mass flow controller.

11. The sensor of claim 7, wherein the sensor is adapted for use in monitoring a frequency of gate oscillations.

12. A system, comprising:
    an ultrasonic mass flow controller with an orifice and a gate adapted to close the orifice; and
    a sensor, including a magnet to generate a magnetic flux, and an induction coil and an electromagnetic pulse detector adapted to cooperate to detect a magnetically induced signal in the induction coil when gate movement provides relative movement between the magnet and the coil.

13. The system of claim 12, further comprising:
    a semiconductor gas source;
    a semiconductor processing chamber; and
    a gas flow line connecting the gas source to the processing chamber, the ultrasonic mass flow controller being adapted to control gas flow through the line from the gas source to the processing chamber.

14. The system of claim 12, further comprising a processor connected to the ultrasonic mass flow controller and the electromagnetic pulse detector.

15. The system of claim 12, wherein the sensor is adapted to sense gate movement.

16. The system of claim 12, wherein the sensor is adapted for use in monitoring a frequency of gate oscillations.

17. The system of claim 12, wherein the magnet includes a permanent magnet.

18. The system of claim 12, wherein the magnet includes an electrically activated magnetic coil.

19. A system, comprising:
    an inflow line;
    a flow controller positioned in the inflow line for controlling flow, the flow controller including a gate and an actuator for moving the gate to control flow;
    a gate position sensor for monitoring whether the gate is in an opened position or a closed position, the sensor including means for transmitting a signal in the flow controller such that a position of the gate in the flow controller affects the signal, and means for receiving the signal and providing a signal output for the sensor to indicate a gate position within the flow controller based on the signal received; and a processor for controlling the position of the gate and for interfacing with the sensor, wherein the sensor includes a magnet, a cooperating induction coil, and an electromagnetic pulse detector, wherein the magnet and the induction coil are operably positioned with respect to the gate, and wherein movement of the gate generates a magnetically induced signal in the induction coil detectable by the electromagnetic pulse detector.

20. The system of claim 19, further comprising:
a semiconductor gas source; and
a semiconductor processing chamber, wherein the ultrasonic mass flow controller is adapted to control gas flow through the inflow line from the gas source to the processing chamber.

21. The system of claim 19, wherein the sensor is adapted to sense gate movement.

22. The system of claim 19, wherein the sensor is adapted for use in monitoring a frequency of gate oscillations.

23. The system of claim 19, wherein the magnet includes a permanent magnet.

24. The system of claim 19, wherein the magnet includes an electrically activated magnetic coil.

25. A semiconductor manufacturing system, comprising:
an ultrasonic semiconductor gas line;
a processing chamber coupled to the gas line;
a flow controller positioned in the gas line, wherein the flow controller further includes:
an orifice;
a gate for controlling gas flow through the orifice and into the processing chamber;
an actuator for oscillating the gate between an opened position and a closed position to control gas flow;
a transmitter for transmitting a signal in the flow controller; and
a receiver for receiving the signal such that the receiver provides an indication of whether the gate is in an opened position or a closed position based on the signal received; and
a processor for interfacing with the actuator, the transmitter and the receiver to control the position of the gate,
wherein the transmitter is a magnet, the signal is magnetic flux from the magnet, and the receiver is a combination of a cooperating induction coil and an electromagnetic pulse detector for detecting a magnetically induced signal in the induction coil, wherein the magnet and the cooperating induction coil are operably positioned with respect to the gate such that a movement of the gate induces the magnetically induced signal in the induction coil by providing relative movement between the magnet and the coil.

26. The system of claim 25, wherein the magnet includes a permanent magnet.

27. The system of claim 25, wherein the magnet includes an electrically activated magnetic coil.

* * * * *